Oct. 21, 1969     P. C. ATCHINSON, SR     3,473,515
MEANS FOR FEEDING EACH OF A SUCCESSION OF SOWS
Filed Feb. 15, 1967     2 Sheets-Sheet 1
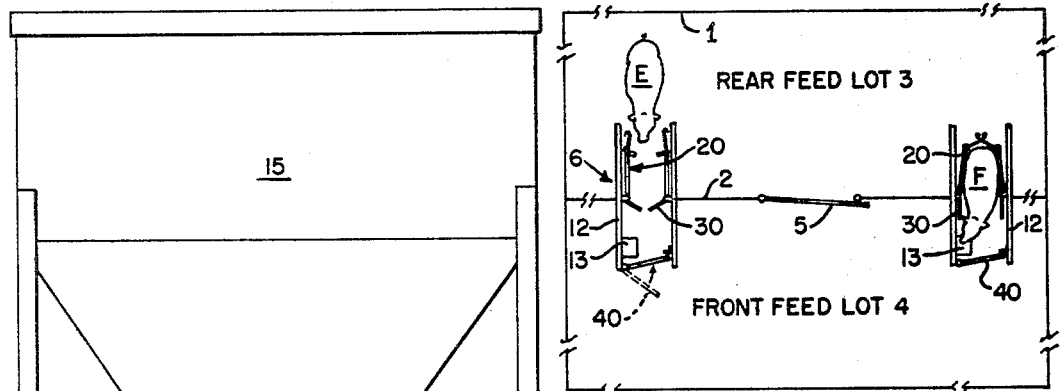
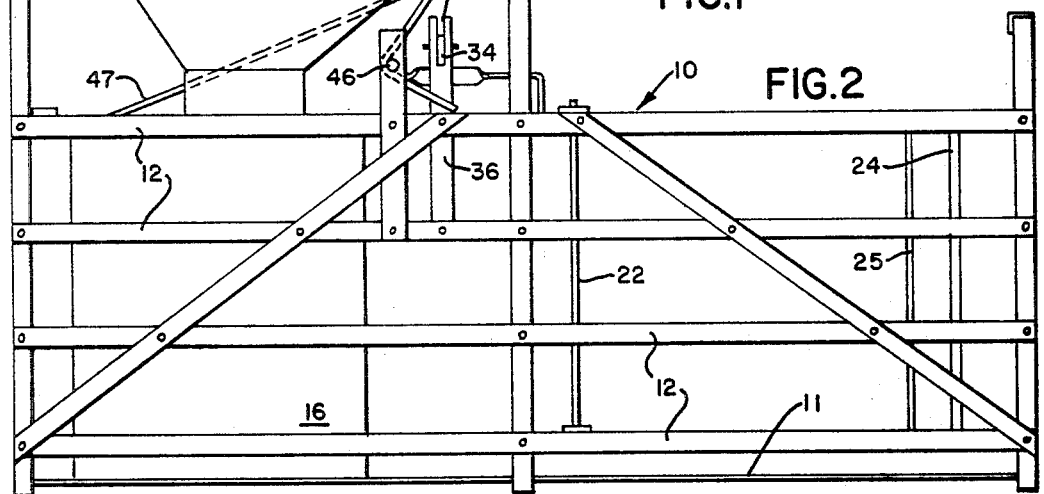
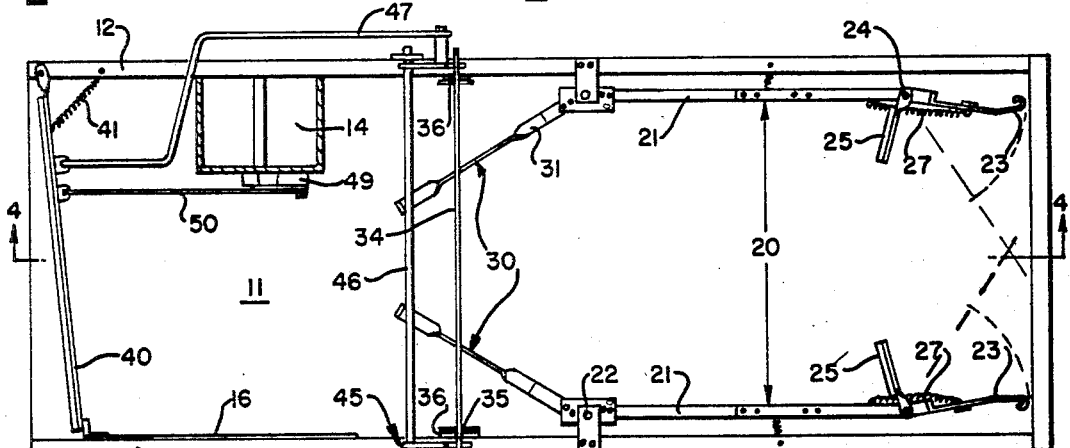
INVENTOR.
PAUL C. ATCHISON, SR.
BY *Arthur F. Robert*
HIS ATTORNEY

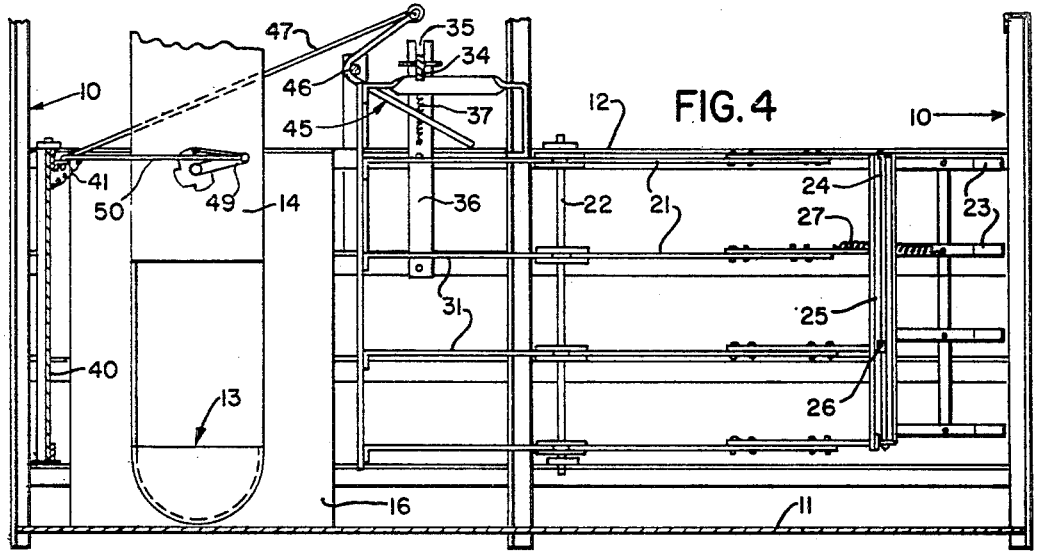
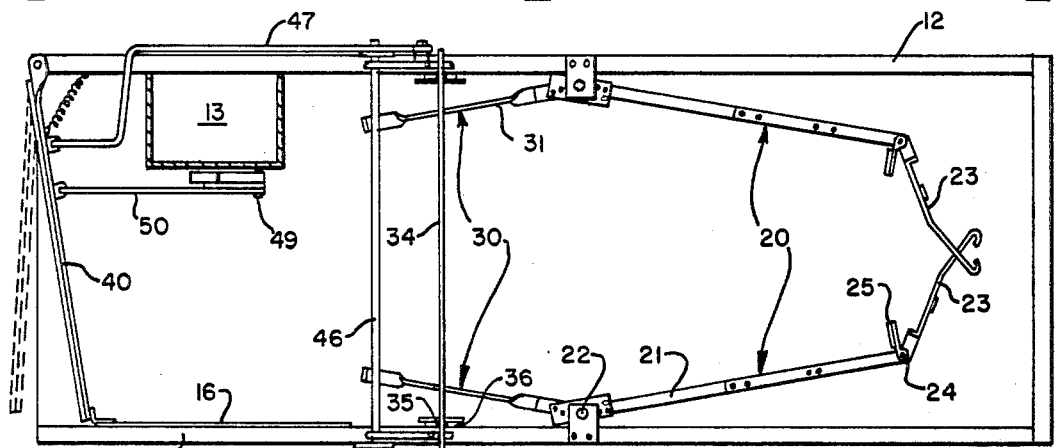
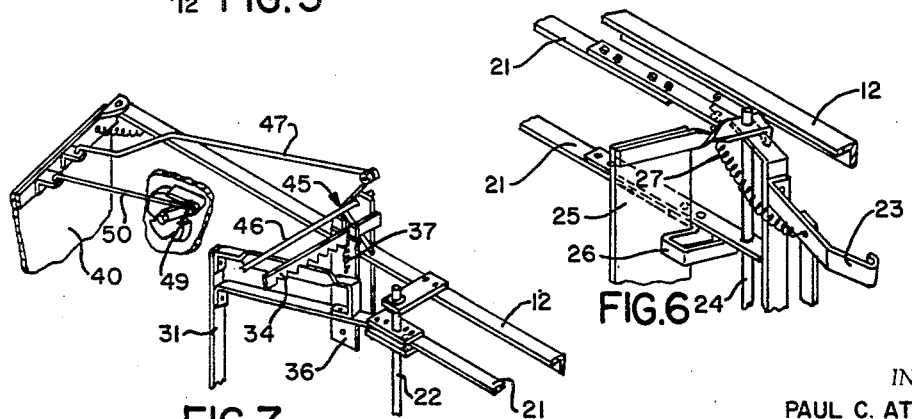

United States Patent Office 3,473,515
Patented Oct. 21, 1969

1

3,473,515
MEANS FOR FEEDING EACH OF A
SUCCESSION OF SOWS
Paul C. Atchinson, Sr., Russellville, Ky., assignor of
one-half to J. H. Spear, Russellville, Ky.
Filed Feb. 15, 1967, Ser. No. 616,246
Int. Cl. A01k 5/00
U.S. Cl. 119—27                                                                11 Claims

ABSTRACT OF THE DISCLOSURE

A limited sow feeder having a narrow-walled corridor, which connects a rear pre-feed lot with a front post-feed lot. The corridor receives metered feed at a side feed station near its front end and provides a sow-length feed-stall extending rearwardly from that station. It has a yieldably open "rear-entrance" gate at its rear end and a yieldably closed "front-exit" gate at its front end. As an entering sow moves forwardly in the feed stall, she operates an interposed gate closer to close the rear entrance gate behind her in time to restrict stall occupancy to a single sow. A latch holds the rear entrance gate in its closed position until an exiting sow opens the front exit which immediately recloses. The opening and closing of the exit gate is used only to unlatch the rear entrance gate, which then opens to receive the next sow, but also to trigger a feed mechanism, which operates to provide the front feed station with the next batch of feed for the next sow.

In operation, a sow enters the rear end of the stall through the open entrance gate. As the sow moves forwardly in the stall to feed at the feed station, she operates the gate-closer to close the entrance gate behind her. A latch holds it closed. When she has consumed all of the feed at the feed station, she exits from the stall by pushing the yieldable normally-close front exit gate open and that gate immediately recloses. In response to the opening-closing movement of the front exit gate, the rear entrance gate opens to receive the next sow while the metered feed mechanism operates to supply the feed station with a limited charge of feed for the next sow.

BACKGROUND OF THE INVENTION

Field of the invention

Th present invention relates to an arrangement capable of feeding a limited amount of feed to each of a succession of sows. More particularly, it relates to a sow-feeder for controlling the individual feed intake of a gestating sow by rendering a predetermined quantity of feed available to that sow.

Description of the prior art

In recent years commercial and purebred hog producers have adopted a limited feeding program for gilts and gestating sows. This enables the quantity and qaulity of the feed to be closely controlled and usually saves feed and labor, reduces the cost of producing a litter and improves the health of each sow and her litter.

There are a number of different methods used to limit-feed each sow. The most common one is to distribute a controlled amount of feed over a feed lot large enough (or along a feed trough long enough) to permit all of a group of sows to feed at the same time. Another method is to provide each sow with access to a self-feeder (or some other unlimited source of feed) on an occasional basis, say every third day. Individual sow-feeders of the type containing the predetermined quantity required to feed one sow are used by some producers to control the feed intake of each sow. The present invention is con-

2 cerned with a sow-feeder arrangement which provides limited batches of feed from a substantially large supply.

SUMMARY OF THE INVENTION

Objects of the invention

The principal objects of the present invention are: to provide an improved sow-feeder of the individual metered feed type which is simple and inexpensive to manufacture, easy to install, and automatic and reliable in operation; and to provide a feeder which is capable of feeding a limited quantity of fed to each of a succession of sows, which is normally open to receive a sow for feeding purposes, which uses sow-actuated means to restrict the entry and use of the feeder to one sow at a time and which, contemporaneously with the exit of that sow, conditions the feeder to receive and feed the next sow.

Another important object of my invention is to use such an automatic sow-feeder to interconnect pre-feed and post-feed lots so that, when all sows are driven into the pre-feed lot, they will successively enter, feed within the exit from the feeder with no more than a minimum of supervision and labor until all of them are fed.

Statement of the invention

All of the foregoing objects of my invention may be substantially achieved in a limited sow-feeding installation which is constructed in accordance with my invention to comprise: (A) a rear pre-feed lot into which all hungry sows may be driven; (B) a front post-feed lot; and (C) an automatic sow feeder providing (1) a lot-interconnecting stall having a normally open rear entrance end to receive a sow, a normally cosed front exit end, and a feed station between ends, (2) means, responsive to the entry of a sow into the stall, to close its rear entrance end, and (3) means, responsive to the exit of the sow through the normally closed front end of the stall, to condition the stall (a) to receive the next sow by reopening the rear end of the stall and (b) to feed the next sow by contemporaneously providing the feed station with feed.

The principal objects of the present invention can be substantially achieved in the preferred form of my feeder which, stated somewhat specifically, comprises: (A) a pair of spaced walls forming a narrow-corridor (1) which connects a rear pre-feed blot with a front post-feed lot, (2) which receives metered feed at a side feed station near its front end and (3) which provides a sow-length feed-stall extending rearwardly from that station; (B) an entrance gate at the rear end of the stall movable between a normal stall-open position and a stall-colsed position; (C) gate closing means operating, in response to the forward movement of a sow into the feed station, to close the entrance gate behind the sow in time to restrict stall-occupancy to a single sow; (D) a yieldable latch operative, when the entrance gate closes, to latch it closed; (E) a yieldable exit gate normally cosing the front end of the stall and actuatable to an open position by an exiting sow as she moves forwardly out of the stall; and (F) reset means operating, in response to the exit of a sow, (1) to unlatch the closed entrance gate so that it returns to its normally open position to receive the next sow, and (2) to supply the feed station with a limited batch of feed for the next sow.

BRIEF DESCRIPTION OF THE DRAWINGS

My invention is illustrated in the accompanying drawings, wherein:

FIG. 1 is a shematic top plan view of my preferred arrangement for feeding a limited amount of feed to each of a succession of sows, and FIGS. 2–7 are views of my presently preferred form of individual sow-feeder, FIG. 2 being a full length side elevational view thereof, FIG. 3 a full length top plan view showing the feeder with its rear entrance gate in its normally-open position and with the rear end portion of that entrance gate in its sow-actuated fully-open position, this view omitting that portion of the feed hopper which projects above the main body of the feeder, FIG. 4 a vertical central section taken along a line corresponding to line 4—4 of FIG. 3, FIG. 5, a top plan view showing the feeder with both gates closed, a partially open position of the front gate being shown in dotted lines, FIG. 6 a fragmentary perspective view of the upper end of the extreme rear end portion of the rear entrance gate on one side of the stall, and FIG. 7 a fragmentary perspective view of the linkage provided for unlatching the rear gate in response to the operation of the exit gate and for contemporanenously operating the feed-metering mechanism.

DESCRIPTION OF THE PREFERRED SOW FEEDING INSTALLATION (FIG. 1)

In this arrangement, an endless fence 1 and a cross partition 2 cooperate to form a rear pre-feed lot 3 and a front post-feed lot 4 which are interconnected by a normally closed common gate 5 and by a pair of identically constructed limited sow feeders 6. When the sows are to be fed, the normally closed gate 5 is opened long enough to permit all of the sows to be directed or driven from the front lot 4 into the rear lot 3 where they normally will instinctively turn to the feeders 6.

Each feeder 6 has side walls 12 spaced to form a corridor containing a sow feeding station 13 at its front end and providing a sow-length feed stall extending rearwardly therefrom, a normally open rear entrance gate 20 to receive sows from the pre-feed lot, a sow actuated gate closer 30 to restrict entry into and use of the feeder to one sow at a time, and a sow actuated exit gate 40 through which the sow leaves the stall to enter the post-feed lot when it has finished feeding.

In FIG. 1 one sow E is about to enter the rear end of the feeder 6 through the open rear entrance gate 20. The other sow F has entered the other feeder 6 and reached her feeding position within the stall. In moving toward this position, she engaged and operated the rear gate closer 30 sufficiently to close the rear entrance gate 20 immediately behind her.

Upon the conclusion of the feeding operation, the sow F will force the yieldably closed exit gate 40 momentarily open as she exits from the stall. The opening and closing movement of this exit gate 40 is used, through reset means not shown in FIG. 1, to unlatch the rear entrance gate 20 so that it reopens to receive the next sow and to meter another batch of feed into station 13 to feed the next sow.

DESCRIPTION OF THE PREFERRED FORM OF SOW-FEEDER (FIGS. 2–7)

The presently preferred form of sow-feeder 6 illustrated, comprises: corridor forming means; a rear entrance gate; rear gate closing means; rear gate latching means; a front exit gate; and reset means.

Corridor forming means

The corridor forming means comprises: a rigid horizontally elongate open-ended box-like metal housing 10 having, between its open rear and front ends, a sheet metal floor 11 and slatted metal side walls 12 horizontally spaced to form a narrow corridor which connects the rear pre-feed lot 3 with the front post-feed lot 4, which receives metered feed at a side feed station 13 near its front end and which provides a sow-length feed-stall extending rearwardly from that station. A feed metering mechanism 14 is provided between the feed station 13 and an upper feed hopper 15, and arranged, when actuated, to discharge a metered amount of feed into the feed station 13 which preferably is in the form of an upwardly open trough, although it may be of any form including the corresponding portion of the floor 11. The front end portions of opposed side walls 12 may be provided with sheet metal liners 16 to blank the feed area from the view of other sows.

Rear entrance gate

While any suitable form of rear entrance gate 20 may be employed, the preferred form shown comprises: a pair of horizontally spaced identically-constructed sectional metal gate-like assemblies, one on each side of the corridor adjacent the corresponding side wall 12; and means vertically hinging the front end of each assembly to the adjacent side wall for horizontal swinging movement between open and closed positions.

Each gate-like assembly comprises: an outwardly (spring) biased slatted metal gate panel 21 pivotally mounted at its front end to the adjacent side wall 12 through a vertical hinge pin 22; a succession of vertically spaced yieldable (strap spring) fingers 23 pivoted to the rear end of the gate panel 21 through rear hinge pin 24 for movement between a rear gate closed position in which they extend rearwardly inward from the rear end of gate panel 21 to another position in which they extend rearwardly more or less as a straight extension of gate panel 21; and an anti-backup metal stop plate 25 vertically arranged on the front inner side of the fingers 23 and pivotally mounted to the rear end of the panel 21 through rear hinge pin 24 for angular movement forwardly about pin 24 from a stop position, in which it extends laterally inward toward the corresponding plate 25 of the opposed assembly, to a "pass-through" position in which it extends forwardly inward.

The gate panels 21 preferably are made in at least two sections so that their lengths can be adjusted somewhat. Each anti-backup plate 25, in its rear stop position, engages an abutment 26 (FIG. 6) which prevents further rearward swinging movement. The abutment is mounted on an adjacent slat of the adjacent gate panel 21.

The front end of fingers 23 are rigidly mounted upon the bight of a vertically arranged U-shaped strap, the legs of which are carried by the rear hinge pin 24 of gate panel 21. The fingers 23 on one gate panel are horizontally aligned with the spaces between the fingers 23 of the other gate panel so that they can enter said spaces (or interfit) when the opposed gate panels 21 swing inwardly toward each other.

With this arrangement, when the entrance gate 20 is normally open, the fingers 23 on opposed panels 21 are yieldably urged toward each other by springs 27. Each normally-open succession of fingers extends inwardly from its panel 21 at a suitable 50 to 60° angle, such as the one indicated by a dotted line in FIG. 3, and cooperates with the opposed fingers to form a narrow vertical slot-like opening which is big enough to receive at least the snout of an entering sow E. This slot-like entrance gate can now be widened by the sow enough to permit her to force her way into the stall with ease. FIG. 3 shows the feeder with each of the panels 21 of the rear entrance gate 20 in its normally-open outwardly-biased position and with each succession of the fingers 23 swung outwardly from its inwardly-directed normally-open position into its sow-actuated fully-open position wherein fingers 23 stretch spring 27. When the entrance gate is closed by one sow, the fingers 23 cross (or interfit with) each other to prevent another sow from forcing its way into the stall, while the vertical free end edges of the plates 25 may be widely spaced apart as shown in FIG. 5 or located closer to each other.

Rear gate closing means

The entrance gate closer 30 comprises: a pair of horizontally spaced forwardly-converging slatted side panels 31, one on each side of the corridor, each closer panel 31 being rigidly connected to the corresponding gate panel 21 to constitute a forward extension thereof. When the rear entrance gate is open, the gate closer panels 31 occupy a sow-blocking position wherein they converge toward each other and obstruct the path of a sow moving forwardly in the feed stall. This compels the sow to engage the closer panels 31 and spread them apart before the sow can reach the feed station. When spread apart, each gate closer 31 occupies a sow-clearing position. As a consequence of the movement of each gate closer 31 from its sow-blocking position to its sow-clearing position, the rear entrance gate is moved toward and into its closed finger-crossing position, which is shown in FIG. 5.

As long as the sow remains in its feeding position, it will normally remain in contact with the gate closer panels 31 and thus tend to hold the rear gate closed.

Rear gate latching means

Any suitable means may be used to latch the rear entrance gate in its closed position. In the embodiment illustrated, both closer panels 31 are extended upwardly (see FIG. 7) so that their top horizontal rails may be latched by a single cross latch bar 34 at an elevation high enough to clear the back of the tallest sow. Each half of this transverse latch bar 34 has ratchet-like serrations on its lower edge designed for latching engagement with the upper edge of the corresponding closer panel extension to permit outward (rear gate closing) movements of the closer panels 31 and prevent inward (rear gate opening) movement thereof. The latch bar 34 is mounted on the housing 10 by extending its opposite ends through vertical slots 35 in the upper ends of opposite sidewall brackets 36 and is biased downwardly toward the lower end of the slots 35 through one or more springs 37.

Front exit gate

The front exit gate is preferably in the form of a sheet metal door or gate 40 which is pivoted to one side wall 12 for sow-actuated movement from a gate-closed position to a gate-open position. The exit gate is yieldably urged to its closed position by a spring 41 which insures immediate reclosure upon the exit of a sow.

Reset means

The reset means comprises: a release linkage interconnecting the exit gate 40 with the latch bar 34; and a feed linkage interconnecting exit gate 40 with the feed metering mechanism 14. The reset means operates, in response to the opening-closing movement of the exit gate, to unlatch the latch bar 34 and thereby release the rear gate so that it may swing to its yieldably open position and to actuate the feed metering mechanism so that it will discharge another batch of feed into the feed station.

The exit-gate-actuated release linkage comprises: a pair of bellcranks 45, one pivotally mounted at each side of the corridor through a common bracket-mounted rocker shaft 46 for angular movement from a "latching" position, in which its rear arm extends rearwardly horizontal and closely underlies the latch bar 34, to an "unlatching" position in which its rear arm extends rearwardly upward and holds its end of the latch bar 34 at an elevated unlatching position; and a crank arm 47 connecting the front arm of the bellcrank 45 with the front exit gate 40. It will be understood that when the exit gate opens, the crank arm 47 will pull the front upright arm of one bellcrank 45 forwardly and thus cause the rear arms of both bellcranks to swing upwardly into lifting engagement with the latch bar 34 during which they unlatch that bar.

The exit-gate-actuated feed linkage includes: an operating arm 49 mounted on the feed metering mechanism 14 for oscillating movement from a normal "exit gate-closed" position to an "exit gate-open" position and thence back to its normal position, during which movement the feed metering mechanism is indexed to discharge a controlled or predetermined quantity of feed into the feed station 13; and an actuating link 50 interconnecting the operating arm 49 with the exit gate 40 to actuate the feed metering mechanism upon the opening and closing movement of the exit gate.

MODIFICATIONS

While I have shown a pair of entrance gate panels 21 and a pair of gate closer panels 31, there is no reason why one panel in each can't be used.

The arrangement of FIG. 1 may be used to provide each sow with access to a relatively unlimited quantity of feed on an occasional basis, say every third day. In this event, the feed supply mechanism, which supplies feed to the feed station 13, may be of the unlimited self-feeding type rather than of the type which feeds a predetermined quantity of feed to each sow.

In the arrangement of FIG. 1, it may be preferable to have the fence 2 relocated to extend transversely parallel to the fence 2 shown but at a position corresponding to the rear entrance end of the feeders 6 rather than to the feeder's mid portion as shown.

Also, as can be seen in FIGS. 3 and 5, each rear gate panel 21 cooperates with its closer panel 31 to form, on the stall side, an obtuse angle greater than 90° and less than 180°. It may be very desirable, in some cases, to mount either or both of these panels in an adjustable manner permitting the obtuse angle between them to be changed easily and quickly to accommodate larger or smaller sows. Thus by adjusting one or both closer panels 31 to decrease the obtuse angle, a smaller immature sow can close the gate panels 21 just as effectively as a larger fully matured sow.

Having described my invention, I claim:

1. A sow feeder comprising:
 (A) side walls spaced to form an interposed stall having
  (1) front and rear ends, and
  (2) a feed station near its front end;
 (B) a normally-open gate at the rear end of the stall;
 (C) a yieldably-closed exit gate at the front end of the stall; and
 (D) gate-closing means operating, in response to the entry of a sow into the stall through the normally open rear entrance gate, to close the said entrance gate behind the sow,
  (1) said gate-closing means including
   (a) a gate closer member substantially elevated above the floor of the stall and normally arranged in an operative horizontal sow-blocking position such that it extends in and across the path of the body of a sow moving forwardly within said stall, and
   (b) means mounting said elevated closer member for sow-actuated movement from said sow-blocking position to a sow-clearing position when said closer member is engaged by the body of a forwardly moving sow.

2. The feeder of claim 1 wherein:
 (A) said closer member is pivotally mounted on a mid-portion of one side wall of the stall for horizontal transversely-forward swinging movement
  (1) from its said operative sow-blocking position, which it occupies when the rear gate is open,
  (2) to said sow-clearing position, which it occupies when the rear gate is closed and in which it extends from its sidewall mounting forwardly along the same side of the stall.

3. The feeder of claim 2 wherein:
 (A) said closer member comprises a forward extension of said rear entrance gate.

4. The feeder of claim 2 wherein:
 (A) said entrance gate (1) is initially actuatable from its normally open position to a more widely open position through the engagement of its rear end by an entering sow, and
(2) is actuatable from its widely open position to its closed position through the engagement of said closer means by a sow moving forwardly within the stall;
(B) said feeder includes holding means operating, in response to the closure of said rear entrance gate to latch that gate closed.

5. The feeder of claim 3 wherein:
(A) said yieldably closed front exit gate is sow actuatable to an open position through engagement with an exiting sow; and
(B) said feeder includes reset means operating, in response to the opening of said front exit gate, to unlatch said entrance gate.

6. The feeder of claim 5 wherein:
(A) said rear entrance gate is yieldably biased toward its normally-open position and operative, when unlatched while in its closed position, to return to its open position.

7. The sow feeder of claim 1 wherein:
(A) said entrance gate is formed by a pair of rearwardly extending opposite side panels, one on each side of the stall,
  (1) the forward end of each side panel being pivotally mounted on the mid-portion of the adjacent side wall,
  (2) each side panel being horizontally swingable between open and closed positions.

8. The feeder of claim 7 including:
(A) a panel-like extension for the rear end of each side panel,
  (1) each extension being
    (a) composed of a vertical series of spaced fingers and
    (b) mounted pivotally on the rear end of its side panel for movemnet bodily therewith and relative thereto,
  (2) each side panel extension cooperating with the other side panel extension
    (a) to form, in a gate open position, a slot-like entrance opening at least wide enough to receive the snout of an entering sow and
    (b) to interfit and cross each other in the gate closed position.

9. The feeder of claim 7 wherein:
(A) said rear gate closer member is in the form of a pair of opposite panel-like structures, one for each side panel,
  (1) each panel-like structure constituting a forward extension of its side panel and occupying a sow-blocking position, when the entrance gate is open, and a sow-clearing position, when the entrance gate is closed,
  (2) said pair of forward panel-like extension structures extending
    (a) in the sow-blocking position, in and across the path of the body of a sow moving forwardly in said stall and
    (b) in the sow-clearing position, forwardly alongside the adjacent side wall.

10. The feeder of claim 9 including:
(A) holding means operating, in response to the closure of said rear entrance gate, to latch that gate closed.

11. The feeder of claim 10 wherein:
(A) said rear entrance gate is yieldably biased to its open position and operative, when unlatched while in its closed position, to return to its open position;
(B) said yieldably closed front exit gate is sow-actuatable to an open position through engagement with an exiting sow; and
(C) said feeder includes
  (1) a feed station at its front end, and
  (2) a feed supply means operable, when actuated, to supply a metered amount of feed to said feed station, and
  (3) reset means responsive to the opening-closing movement of said front exit gate, to actuate said feed supply means and contemporaneously unlatch said closed rear entrance gate.

References Cited
UNITED STATES PATENTS

| | | | |
|---|---|---|---|
| 233,888 | 11/1880 | Snell | 119—55 |
| 2,814,271 | 11/1957 | Black | 119—55 |

HUGH R. CHAMBLEE, Primary Examiner

U.S. Cl. X.R.

119—54